United States Patent
Bartmann et al.

(10) Patent No.: US 9,989,353 B2
(45) Date of Patent: *Jun. 5, 2018

(54) REGISTERING OF A SCENE DISINTEGRATING INTO CLUSTERS WITH POSITION TRACKING

(71) Applicant: FARO Technologies, Inc., Lake Mary, FL (US)

(72) Inventors: Sebastian Bartmann, Stuttgart (DE); Helmut Kramer, Mainbernheim (DE); Daniel Pompe, Stuttgart (DE); Michael Schanz, Gerlingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/683,892

(22) Filed: Aug. 23, 2017

(65) Prior Publication Data

US 2017/0370701 A1 Dec. 28, 2017

Related U.S. Application Data

(63) Continuation of application No. 15/345,609, filed on Nov. 8, 2016, now Pat. No. 9,746,311, which is a
(Continued)

(30) Foreign Application Priority Data

Aug. 1, 2014 (DE) ........................ 10 2014 110 992

(51) Int. Cl.
*G01B 11/24* (2006.01)
*G01B 11/00* (2006.01)
(Continued)

(52) U.S. Cl.
CPC ........ *G01B 11/002* (2013.01); *G01B 11/2518* (2013.01); *G01B 21/16* (2013.01);
(Continued)

(58) Field of Classification Search
CPC ..... G01B 11/2518; G01B 11/24; G01B 11/25; G01B 11/2522; G01S 17/89
(Continued)

(56) References Cited

U.S. PATENT DOCUMENTS 6,804,380 B1   10/2004   Ioannou et al.
7,453,459 B2   11/2008   Shekter
(Continued)

FOREIGN PATENT DOCUMENTS

DE   102009015922 A1   10/2010
DE   202010013825 U1   2/2011
EP       2682783 A1    1/2014

OTHER PUBLICATIONS

Bornaz, Leandro et al., "Multiple Scan Registration in Lidar Close-Range Applications"; The International Archives of the Photogrammetry, Remote Sensing and Spatial Information Sciences, vol. XXXIV, Part 5/W12; 2003; pp. 72-77; 6 pages.
(Continued)

*Primary Examiner* — Md M Rahman
(74) *Attorney, Agent, or Firm* — Cantor Colburn LLP

(57) ABSTRACT

A method for optically scanning and measuring a scene by a laser scanner includes generating multiple scans; tracking scanner positions with a position-tracking device for the multiple scans and providing tracked scanner positions in response; registering sequentially scans selected from the multiple scans into clusters using registration points or targets and confirming registration of the scans into the clusters according to specified quality criteria being fulfilled; selecting scans from the clusters and forming pairs of scans;
(Continued)

forming an intersection of the selected pairs and comparing a size of the intersection with a threshold value obtained based at least in part on the tracked scanner positions; and attempting to register the pairs of scans if the size of the intersection exceeds the threshold value and accepting the registered pairs of scans if the registration is successful.

7 Claims, 6 Drawing Sheets

Related U.S. Application Data continuation of application No. 14/815,195, filed on Jul. 31, 2015, now abandoned.

(51) Int. Cl.
*G01S 17/89* (2006.01)
*G01S 17/02* (2006.01)
*G01S 7/48* (2006.01)
*G01B 11/25* (2006.01)
*G01B 21/16* (2006.01)
*G01S 17/06* (2006.01)

(52) U.S. Cl.
CPC .......... *G01S 7/4808* (2013.01); *G01S 17/023* (2013.01); *G01S 17/06* (2013.01); *G01S 17/89* (2013.01)

(58) Field of Classification Search
USPC .......................................... 356/607
See application file for complete search history.

(56) References Cited

U.S. PATENT DOCUMENTS

| | | |
|---|---|---|
| 8,013,983 B2 | 9/2011 | Lin et al. |
| 2005/0267364 A1* | 12/2005 | Gueck .................. A61B 5/1075 600/437 |
| 2006/0188143 A1 | 8/2006 | Strassenburg-Kleciak |
| 2008/0310757 A1 | 12/2008 | Wolberg et al. |
| 2009/0232388 A1 | 9/2009 | Minear et al. |
| 2010/0201829 A1* | 8/2010 | Skoskiewicz ............ G08G 1/04 348/211.2 |
| 2012/0069352 A1 | 3/2012 | Ossig et al. |
| 2012/0140202 A1 | 6/2012 | Rothenberger |
| 2013/0054187 A1 | 2/2013 | Pochiraju et al. |
| 2013/0176532 A1* | 7/2013 | Sharma .................. A61B 3/102 351/206 |
| 2015/0285613 A1 | 10/2015 | Kilpatrick et al. |
| 2015/0285913 A1 | 10/2015 | Becker et al. |

OTHER PUBLICATIONS

Errington, Angus et al., "Closure Monitoring in Potash Mines Using LiDAR". In: IECON 2010—36th Annual Conference on IEEE Industrial Electronics Society, 2010, S. 2823-2827, 5 pages.
German Office Action for Application No. DE 10 2014 110 992.9 dated Jun. 12, 2015; 7 pgs.
Zhou, H., et al., "Accurate integration of multi-view range images using κ-means clustering" Pattern Recognition, Elsevier, GB, vol. 41, No. 1, Aug. 23, 2007, pp. 152-175, XP022208716.
http://lanmarservices.com/2015/01/20/tagets-scanning/ 3 pgs (accessed Jan. 23, 2018).

* cited by examiner

REGISTERING OF A SCENE DISINTEGRATING INTO CLUSTERS WITH POSITION TRACKING

CROSS REFERENCE TO RELATED APPLICATIONS

The present application is a continuation of U.S. application Ser. No. 15/345,609 filed on Nov. 8, 2016, which is a continuation application of U.S. application Ser. No. 14/815,195 filed Jul. 31, 2015 which claims the benefit of German Patent Application Number 10 2014 110 992.9 filed Aug. 1, 2014, the contents of which are hereby incorporated by reference in their entirety.

FIELD OF THE INVENTION

The invention relates to a method for optically scanning and measuring a scene using a laser scanner.

BACKGROUND

U.S. Published Patent Application No. 2012/0069352, which is incorporated by reference herein, describes a method for optically scanning and measuring a scene using a laser scanner, in which a scene is registered with multiple scans. For this purpose, the laser scanner is taken to a new location after a scan to generate an additional scan. The generated scans with their measuring points are registered in a joint coordinate system, wherein the entity of measuring points forms a three-dimensional (3D) point cloud.

Through use of known methods for registering multiple scans of a scene, the registering process, which may be based on the pairwise examination of two scans, should theoretically be unambiguous and may take place completely automatically. In practice, however, for reasons of performance, not all scans are typically examined pairwise, but usually only within a neighborhood that results, for example, from the history of registering of the scene. This is why interruptions in the registering process may occur.

Embodiments of the present invention are based on improving a method of the type mentioned hereinabove.

SUMMARY OF THE INVENTION

According to an embodiment of the present invention, a method for optically scanning and measuring a scene by a laser scanner configured to measure three-dimensional (3D) coordinates includes generating multiple scans with the laser scanner; tracking positions of the laser scanner with a position-tracking device for the multiple scans and providing tracked scanner positions in response; registering sequentially scans selected from the multiple scans into clusters using registration points or registration targets and confirming registration of the scans into the clusters according to specified quality criteria being fulfilled; selecting scans from the clusters and forming pairs of scans; forming an intersection of the selected pairs and comparing a size of the intersection with a threshold value obtained based at least in part on the tracked scanner positions, the threshold value being selected from the group consisting of a number of the registration points contained in the intersection, a number of registration targets contained in the intersection, a surface area of the intersection, and a one-dimensional characteristic of the intersection; and attempting to register the pairs of scans if the size of the intersection exceeds the threshold value and accepting the registered pairs of scans if the registration is successful.

BRIEF DESCRIPTION OF THE DRAWINGS

The invention is explained in more detail below on the basis of exemplary embodiments illustrated in the drawings, in which.

DETAILED DESCRIPTION

Figure 5:
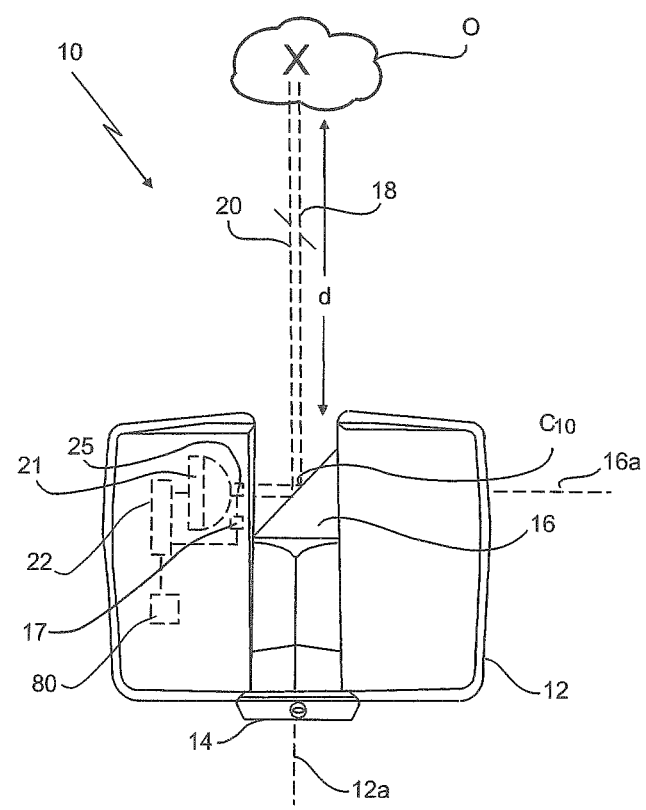
FIG. 5 is a schematic, partially cut representation of a laser scanner in operation.
Figure 6:
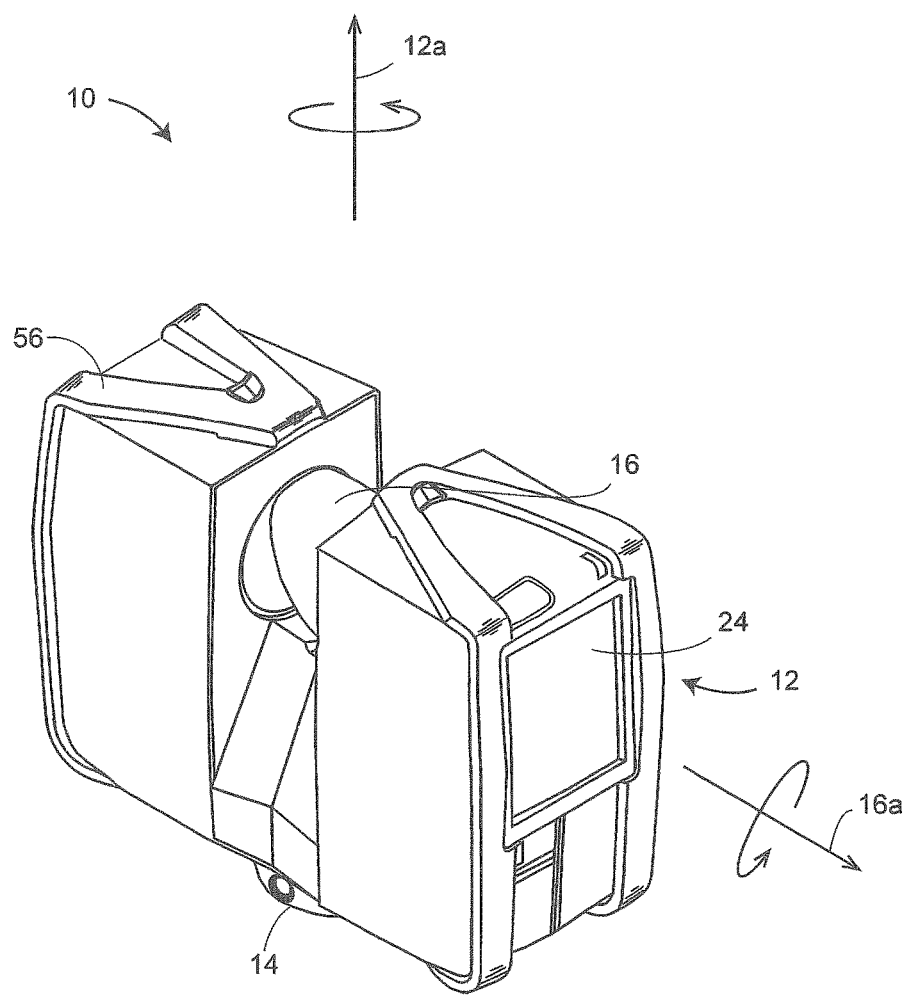
FIG. 6 is a perspective view of the laser scanner of FIG. 5.

Referring to FIGS. 5 and 6, embodiments of the present invention relate to a 3D coordinate measurement device which steers a beam of light to an object O, which may either be a cooperative target such as a retroreflector or a non-cooperative target such as a diffusely scattering surface of the object O. A distance meter in the device measures a distance to the object O, and angular encoders measure the angles of rotation of two axles in the device. The measured distance and the two angles enable a processor in the device to determine the 3D coordinates of the object O. Embodiments of the present invention disclose a laser scanner 10 as the 3D coordinate measurement device, but various other embodiments utilizing a laser tracker or total station should be clear to one of ordinary skill in the art.

Laser scanners are typically used for scanning closed or open spaces such as interior areas of buildings, industrial installations and tunnels. Laser scanners are used for many purposes, including, for example, building information modeling (BIM), industrial analysis, accident reconstruction applications, archaeological studies, and forensics investigations. A laser scanner can be used to optically scan and measure objects in a volume around the laser scanner through the acquisition of data points representing objects within the volume. Such data points are obtained by transmitting a beam of light onto the objects and collecting the reflected or scattered light to determine the distance, two-angles (i.e., an azimuth angle and a zenith angle), and optionally a gray-scale value. This raw scan data is collected, stored and sent to a processor or processors to generate a 3D image representing the scanned area or object. To generate the image, at least three values are collected for each data point. These three values may include the distance and two angles, or may be transformed values, such as x, y, z coordinates.

In FIGS. 5 and 6, a laser scanner 10 is shown for optically scanning and measuring the environment surrounding the laser scanner 10. The laser scanner 10 comprises a measuring head 12 and a base 14. The measuring head 12 is mounted on the base 14 such that the measuring head 12 can rotate with respect to the base 14 about a first axis 12a, driven by a first rotary drive. The rotation about the first axis 12a may be about the center of the base 14. The measuring head 12 comprises a mirror 16, which can rotate about a second axis 16a, driven by a second rotary drive. Referring to a normal upright position of the laser 10, the first axis 12a may be called the vertical axis or azimuth axis, while the second axis 16a may be called the horizontal axis or zenith axis. The laser scanner 10 may comprise a gimbal point or center $C_{10}$ that is the intersection point of the first axis 12a and the second axis 16a.

The measuring head 12 is further provided with an electromagnetic radiation emitter, such as light emitter 17, for example, that emits an emission light beam 18. In an embodiment, the emission light beam 18 is a coherent light such as a laser beam. The laser beam may have a wavelength range of approximately 300 to 1600 nanometers, for example 790 nanometers, 905 nanometers, 1550 nanometers, or less than 400 nanometers. It should be appreciated that other electromagnetic radiation beams having greater or smaller wavelengths may also be used. The emission light beam 18 may be amplitude or intensity modulated, for example, with a sinusoidal waveform or with a rectangular waveform. Alternatively, the emission light beam 18 may be otherwise modulated, for example, with a chirp signal, or coherent receiver methods may be used. In the present embodiment, the emission light beam 18 is a continuous wave laser beam. However, it may also be a pulsed laser. The emission light beam 18 is emitted by the light emitter 17 onto the mirror 16, where it is deflected to the environment of the laser scanner 10.

A reflected light beam, hereinafter called a reception light beam 20, is reflected from the environment by an object O. The reflected or scattered light is intercepted by the rotary mirror 16 and directed onto a light receiver 21 with reception optics. The directions of the emission light beam 18 and the reception light beam 20 result from the angular positions of the measuring head 12 and the mirror 16 about the axes 12a and 16a, respectively. These angular positions in turn depend on the corresponding rotary drives. The angle of rotation about the first axis 12a is measured by a first angular encoder. The angle of rotation about the second axis 16a is measured by a second angular encoder.

A control and evaluation unit 22 has a data connection with the light emitter 17 and the light receiver 21 inside the measuring head 12, whereby parts of the control and evaluation unit 22 can be arranged also outside the measuring head 12, for example as a computer connected to the base 14. The control and evaluation unit 22 is configured to determine, for a multitude of measuring points X, a corresponding number of distances d between the laser scanner 10 and the measuring points X on object O. The distance to a particular measuring point X is determined based at least in part on the speed of light in air through which electromagnetic radiation propagates from the device 10 to the measuring point X. In an embodiment, the phase shift in the modulated light beam 18, 20, sent to the measuring point X and received from it, is determined and evaluated to obtain a measured distance d.

The speed of light in air depends on the properties of the air such as the air temperature, barometric pressure, relative humidity, and concentration of carbon dioxide. Such air properties influence the index of refraction of the air. The speed of light in air is equal to the speed of light in vacuum divided by the index of refraction. A laser scanner of the type discussed herein is based on the time-of-flight of the light in the air (the round-trip time for the light to travel from the device to the object and back to the device). A method of measuring distance based on the time-of-flight of light (or the time-of-flight of any type of electromagnetic radiation) depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on known length and two known angles of a triangle. The method of triangulation, therefore, does not directly depend on the speed of light in air.

The measuring head 12 may include a display device 24 integrated into the laser scanner 10. The display device 24 includes a user interface, which may be a graphical touch screen, as shown in FIG. 6. For example, the display device 24 may have a user interface that allows the operator to provide measurement instructions to the laser scanner 10, in particular to set the parameters or initiate the operation of the laser scanner 10, and the display device 24 may also display measurement results.

In an embodiment, the scanning of the environment of the laser scanner 10 takes place by rotating the mirror 16 relatively quickly about the second axis 16a while rotating the measuring head 12 relatively slowly about the first axis 12a, thereby moving the assembly in a spiral pattern. In an exemplary embodiment, the rotary mirror 16 rotates at a maximum speed of 5820 revolutions per minute. A scan is defined to be the entity of measuring points X in such a measuring. For such a scan, the center $C_{10}$ defines the origin of the local stationary reference system. The base 14 rests in this local stationary reference system.

In addition to measuring a distance d from the center $C_{10}$ to a measuring point X on the object O, the laser scanner 10 may also collect gray-scale values related to the received optical power. The gray-scale value may be determined, for example, by integration of the bandpass-filtered and amplified signal in the light receiver 21 over a measuring period attributed to the measuring point X. Optionally, color images can be generated by a color camera 25. Through use of these color images, colors (R, G, B) can be assigned to the measuring points X as additional values.

To scan a scene from different directions or a large space, multiple scans are captured from different locations (corresponding to an amount of different centers) and then registered in a joint coordinate system XYZ of the scene. The laser scanner 10 must change its location for this purpose, thus moving each time the center $C_{10}$ of the laser scanner 10 within the joint coordinate system XYZ to a new center from the amount.

For registering the scans, registration points or registration targets can be used. In an exemplary embodiment, registering is performed through use of targets. The targets are localized and identified in overlapping areas of the scans. Both, "natural" targets, i.e., certain formations of the object O, and "artificial" targets, i.e., targets which have been applied especially for the scanning process to the object O or to the environment, for example checker-board patterns, are appropriate as targets. Here the term registration points refer to measurements of natural targets, and registration targets refer to measurements of artificial targets. The geometry in which a target is embedded and which is defined by the adjacent targets, is determined for each target, for example as described in the aforementioned U.S. Published Patent Application No. 2012/0069352. The embedding geometries can then be compared with each other to first automatically find corresponding pairs of targets and then find the best possible assignment of the two scans. When all scans are registered in the joint coordinate system XYZ, the entity of all measuring points X of all scans forms a three-dimensional point cloud 3DP.

It is usually possible to register all scans through use of the targets, even without having additional information on the relative positions of the centers of the scans. To improve performance, the time stamp of the scans can be used to find and register adjacent scans faster. The result of registering can be shown on the display unit 24. A confirmation by the user is optional.

It is, however, also possible that problems occur during registering, for example not enough targets in overlapping areas of the scans, ambiguous, embedding geometries or a difficult topology. It is also possible that problems are present which are not recognized immediately, but only by the user. Therefore, auto clusters can be generated which comprise unambiguously matching scans. For defining such unambiguous matching, specified quality criteria can be defined which must be fulfilled. Such a quality criterion can be, for example, a threshold value for the remaining inverse squares of the targets, after the embedding geometries have been assigned, wherein the quality criterion shall increase with increasing concordance.

According to embodiments of the present invention, the laser scanner 10 is provided with a position-tracking device 80 (FIG. 5), which is connected to the control and evaluation unit 22. The position-tracking device 80 is active at least during the change between different positions, for example $C^{(i)}$ and $C^{(j)}$, of the laser scanner 10 and recognizes this change of position. In particular, the device 80 measures the vector relative position $\Delta C$ of a new position $C^{(j)}$ relative to the preceding position $C^{(i)}$. Various different hardware implementations are possible for the position-tracking device 80.

The position-tracking device 80 can belong, for example, to the group of devices known as hodometers. As such, the laser scanner 10 may be mounted on a trolley as described, for example, in U.S. Pat. No. 8,699,036, which is incorporated by reference herein. The trolley is provided with one encoder each on at least two wheels, for example, on the same axle, each encoder measuring the angle of rotation of the assigned wheel. From the two series of measurement data, the two-dimensional relative movement of the laser scanner 10 can be determined. The position-tracking device 80 can also be provided with an altimeter and/or an inclinometer. In combination with the series of measurement data of the encoders or with the other hodometer data, the three-dimensional relative movement of the laser scanner 10 can be determined. The position-tracking device 80 can further be provided with a compass which provides comparative data for correcting the hodometer data or alternatively replaces the hodometer. The position-tracking device 80 can, for example, register their movement relative to a reference surface by determining the optical flow, as it is described in U.S. Pat. No. 8,384,914, which is incorporated by reference herein.

The position-tracking device 80 can, for example, be configured as an inertial measurement unit ("IMU"). This measures any of its angular velocities and accelerations in the three different directions of space, for which purpose it is provided with three gyroscopes (yaw rate sensors) which are orthogonal to each other and with three accelerometers (acceleration sensors) which are orthogonal to each other. From the series of measurement data, the three-dimensional relative movement of the laser scanner 10 can be determined, for example, by integration.

The position-tracking device 80 can, for example, be configured as a GPS unit. If a free satellite reception is possible, the absolute movement of the laser scanner 10 can be determined. In modified embodiments, the GPS unit may be combined with an "indoor positioning system" and/or with a hodometer and/or an altimeter and/or an inclinometer.

The laser scanner 10 can also be mounted on an autonomously moving robot, as it is described in German Published Patent Application No. DE102012109481A1. The position-tracking device 80, for example the IMU, can then be arranged in the laser scanner 10 or, alternatively, in the robot.

Usually, the possible error when determining the three-dimensional movement of the laser scanner 10 is relatively large. In the case of an altimeter, for example, the possible error may be on the order of magnitude of a floor. With an IMU, the error can also sum up to a large number. As such, it is recommended to first register the scans by a point-based method or by methods utilizing targets.

Figure 1:
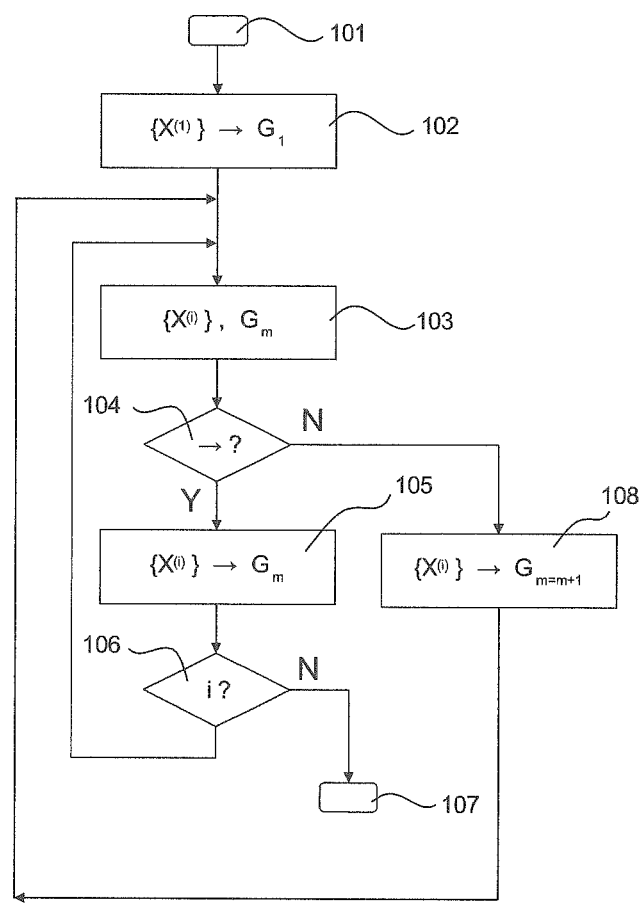
FIG. 1 is a schematic flow diagram of a method of automatic clustering.

In FIG. 1, a schematic representation of the procedure during "auto-clustering" shows how it can be automatically carried out, for example, through use of a suitable filtering device. After an initial step 101, a first cluster $G_l$ is defined in a processing step 102, and the first scan $\{X^{(1)}\}$—initially as the only scan—is assigned to it (shown by an arrow). This first scan $\{X^{(1)}\}$ also defines the coordinate system of the first cluster $G_l$. For a following loop which processes a cluster $G_m$ during every cycle, therefore, during the first cycle, m=1. The further scans $\{X^{(i)}\}$ start with i=2.

The loop then starts, the loop containing a processing step 103 in which a further scan $\{X^{(i)}\}$ is registered for test purposes in the coordinate system of the cluster $G_m$ which is processed at present. For performance reasons, due to the fact that the cluster $G_m$ can contain a relatively large quantity of targets, a pair is formed, for example, from the last successfully registered scan (or another scan) of the cluster $G_m$ and the further scan $\{X^{(i)}\}$, and the pair is registered for test purposes.

A decision process 104 checks whether registering has been successful, i.e., whether the quality criteria for registering are fulfilled. If this is the case (Y), registering is confirmed in a processing step 105, otherwise (N), registering for test purposes is rejected.

A subsequent decision step 106 checks whether further scans $\{X^{(i)}\}$ are available, which have not yet been registered for test purposes in this loop ("free scans"). Such a check usually will take place by an incrementing a loop counter (e.g., number "i" of the scan) and of appropriate flags. If such free scans $\{X^{(i)}\}$ are still available (Y), the loop jumps back to processing step 103 with registering for test purposes. The decision step 106 may take place also at the beginning of the loop. If no free scans $\{X^{(i)}\}$ are available any longer, auto-clustering ends with a final step 107.

If registering for test purposes is rejected after the decision step 104, a new cluster $G_m$ (with m=m+1) is defined in a processing step 108, and the last scan $\{X^{(i)}\}$ registered for test purposes is assigned to this new cluster $G_m$. This last-named scan $\{X^{(i)}\}$ defines the coordinate system of the new cluster $G_m$. The procedure is then continued with processing step 103 of the registering for test purposes.

In a modified embodiment, a new cluster is not immediately started in case of an unsuccessful registering for test purposes, but a specified number of the next free scans $\{X^{(i)}\}$ is tested instead for assigning to the present cluster $G_m$. With a view to performance, it is appropriate to limit the number of these scans still to be tested, by defining a limit, for example by the time stamp or the continuous number of the scan, i.e., a limit with respect to space and/or time, so that it is only tried to register scans which are adjacent with respect to time (and consequently usually also with respect to space) for test purposes. This reduces the complexity of registering.

In an alternative to the described serial procedure, the scans $\{X^{(i)}\}$ can be tested pairwise, in a more parallel method (corresponding to the crystal growth), for registering for test purposes. From each matching pair, a cluster $G_m$ is formed as a nucleation site. From the clusters $G_m$ or from single scans from the clusters $G_m$ and the free scans $\{X^{(i)}\}$, new pairs arise, which again are checked for being registered for test purposes, until, in the end, no further registering is successful.

In the case of a building, the clusters $G_m$ frequently comprise adjacent scans $\{X^{(i)}\}$ of the same room, the same floor, the same building or from its interior and exterior.

The problem remains to join the clusters $G_m$, for example on an appropriate registering device. The data of the position-tracking device 80 are used for this purpose.

Figure 2:
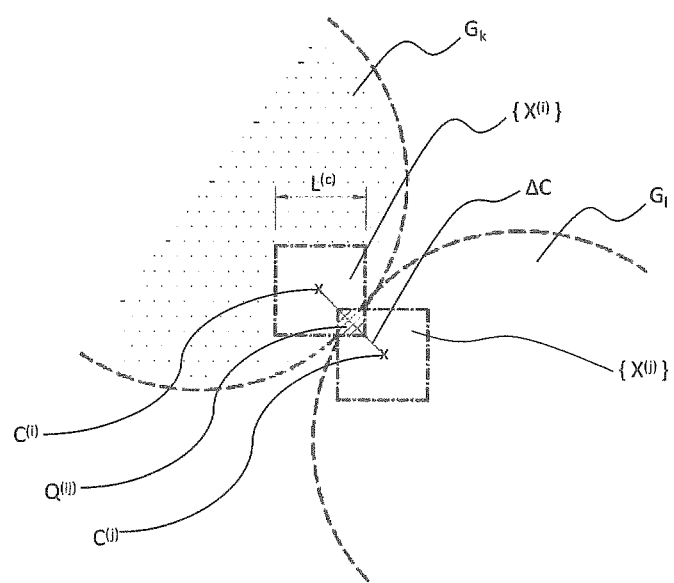
FIG. 2 is a schematic representation of clusters.

Referring to FIG. 2, joining of the clusters $G_m$ can be visualized, for example to show the progress. There are different possible methods to join the clusters $G_m$, using the data of the position-tracking device 80. Such data, supplied by the position-tracking device 80, may be the relative positions $\Delta C$, or absolute positions, of the positions $C^{(i)}$ of the laser scanner 10, which, at the same time, are the centers of scans $\{X^{(i)}\}$ which have already been generated or which are considered (or briefly considered).

To compare such a relative position $\Delta C$ with the size of a scan $\{X^{(i)}\}$, the scan $\{X^{(i)}\}$ may be described approximately by a characteristic shape, for example a circle, a sphere, a square or a cube. A characteristic length $L^{(c)}$ is assigned to the characteristic shape, such characteristic length describing the size of the characteristic shape and thus being intended to also describe the size of a scan $\{X^{(i)}\}$, for example the diameter of the circle/sphere or the edge length of the square/cube or a measure. The characteristic length $L^{(c)}$ can depend on the range of the laser scanner 10 and on the characteristics of the scene and result, for example, from the standard deviation of the measuring points $X^{(i)}$ of a scan $\{X^{(i)}\}$ from its center $C^{(i)}$ or from another statistical value. The characteristic shape is arranged around a position or a center $C^{(i)}$ each of the scan $\{X^{(i)}\}$, and the characteristic length $L^{(c)}$ may be identical for all scans $\{X^{(i)}\}$. If appropriate, the characteristic length $L^{(c)}$ is changed during the process, for example if not all clusters $G_m$ can be joined. Performance increases, if, for comparisons with the relative position $\Delta C$, instead of the scans $\{X^{(i)}\}$ with all of their measuring points $X^{(i)}$, at first only the characteristic shape with the assigned characteristic length $L^{(c)}$ is used.

The intersection $Q^{(ij)}$ of two already generated scans $\{X^{(i)}\}, \{X^{(j)}\}$ or of a generated scan $\{X^{(i)}\}$ with a considered scan at a position $C^{(j)}$ follows from the idea of the characteristic length $L^{(c)}$. For this purpose, the intersection $Q^{(ij)}$ at first is defined as an overlap of the two characteristic shapes around the respective centers $C^{(i)}, C^{(j)}$, the size of the intersection $Q^{(ij)}$ referring to the number of measuring points $X^{(i)}, X^{(j)}$ and/or targets contained in the intersection $Q^{(ij)}$, which are counted correspondingly (in the version with the considered scan, it is possible only to count in the generated scan). Optionally, the size of the intersection $Q^{(ij)}$ refers, however, merely to the surface area of intersection $Q^{(ij)}$, which ultimately is determined from the relative position $\Delta C$ and the characteristic length $L^{(c)}$. In a simplified third definition of the size of the intersection $Q^{(ij)}$, the intersection $Q^{(ij)}$ is determined one-dimensionally, in particular as the difference between the characteristic length $L^{(c)}$ and the amount of relative position $\Delta C$. Further definitions are possible.

The intersection $Q^{(ij)}$ can be compared with a pre-determined threshold value $Q^{(c)}$ which depends on the characteristic length $L^{(c)}$ and, if appropriate, on further statistical values of the scans $\{X^{(i)}\}$. In case of the second definition with the surface area, the threshold value can be, for example $Q^{(c)}=L^{(c)}*L^{(c)}/10$, in case of third definition with the one-dimensional intersection, for example $Y^{(c)}=L^{(c)}/5$. Further definitions and additional modifications are possible here as well.

Figure 3:
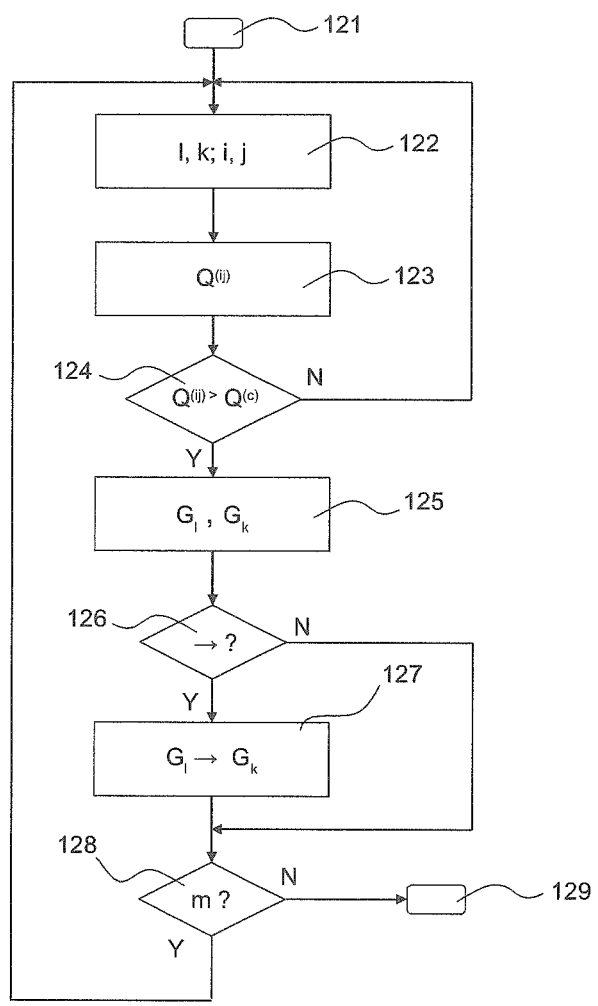
FIG. 3 is a schematic flow diagram of a method of joining of the clusters using data from a position-tracking device.

Referring to the flow diagram of FIG. 3, a first method ("post registration"), which, in terms of time, takes place after the generation of all scans $\{X^{(i)}\}$. After an initial step 121, two clusters and one scan from each of the two clusters are selected in a processing step 122, which together form a pair for registering for test purposes. More precisely, a scan $\{X^{(i)}\}$ in the coordinate system of which a second cluster $G_l$ shall be registered for test purposes, is selected, for example, from a first cluster $G_k$, for which purpose again, a scan $\{X^{(i)}\}$ is selected from this second cluster $G_l$, and the two scans $\{X^{(i)}\}, \{X^{(j)}\}$ form the pair. From the data of the position-tracking device 80, at least the approximate relative position $\Delta C$ results, in which their respective centers $C^{(i)}, C^{(j)}$ are relative to each other.

In a processing step 123, the overlapping area of the two scans $\{X^{(i)}\}, \{X^{(j)}\}$ is determined (at least approximately), i.e., the intersection $Q^{(ij)}$ of the two scans $\{X^{(i)}\}, \{X^{(j)}\}$ is formed, and their size is determined according to one of the above definitions. In a decision step 124, it is checked whether the intersection $Q^{(ij)}$ is sufficiently large with respect to the pre-determined threshold value $Q^{(c)}$. If the intersection $Q^{(ij)}$ is not sufficiently large (N), i.e., in particular, if it falls below the threshold value $Q^{(c)}$, the selection of the pair of scans $\{X^{(i)}\}, \{X^{(j)}\}$ is rejected, and the procedure jumps back to processing step 122. If, however, the intersection $Q^{(ij)}$ is sufficiently large (Y), it is tried, in a processing step 125, to register the pair for test purposes similar to processing step 103, and to thus join the clusters. In a decision step 126, it is checked whether such joining has been successful. If this is the case (Y), a confirmation of registering takes place in processing step 127 (corresponding to processing step 105). Otherwise (N), the two clusters remain separated. In a further decision step 128 (which can be arranged also at another point of the loop) it is checked whether there are still clusters $G_m$ left, which have not yet been joined, i.e., which are still "free." If this is the case (Y), the loop continues with processing step 122. Otherwise (N), all clusters $G_m$ are joined, so that the process can be concluded with a final step 129.

Further possible methods exist in the case of an onsite registration, i.e., in terms of time between the generation of the scans $\{X^{(i)}\}, \{X^{(j)}\}$.

Figure 4:
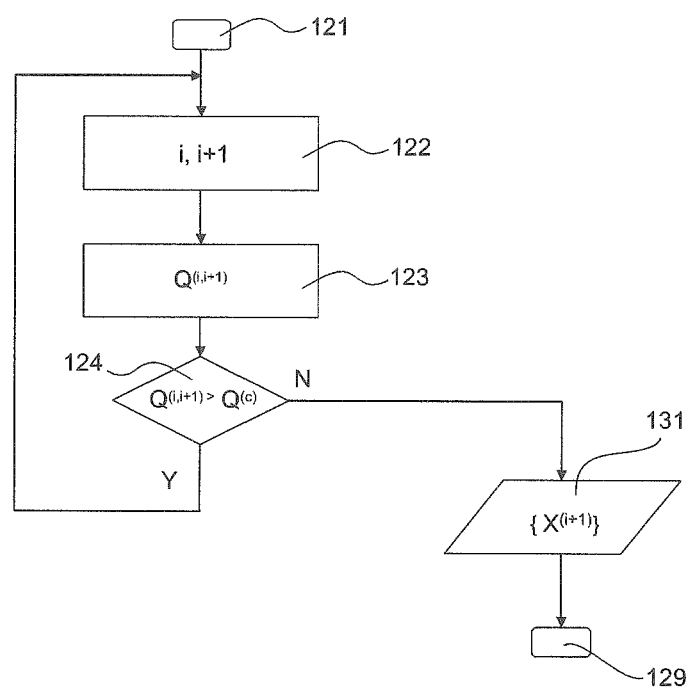
FIG. 4 is a schematic flow diagram of a method of joining of the clusters with the generation of additional scans depending on the data of a position-tracking device.

Referring to FIG. 4, according to another method embodiment, during the change of position of the laser scanner 10, starting with an initial step 121, the generation of a scan $\{X^{(i)}\}$ with the center at the present position $C^{(i+1)}$ from the data of the position-tracking device 80, more precisely of the rough relative position $\Delta C$ of the present position $C^{(i+1)}$ to the center $C^{(i)}$ of the last generated scan $\{X^{(i)}\}$ (i.e. the scan generated last), is considered in a processing step 122. Starting from the relative position $\Delta C$ and from the characteristic length $L^{(c)}$, the overlapping area between the last generated scan $\{X^{(i)}\}$ and the considered scan $\{X^{(j+1)}\}$ is estimated in processing step 123, i.e., an imaginary intersection $Q^{(i,i+1)}$ between the last generated scan $\{X^{(i)}\}$ and the considered scan $\{X^{(i+1)}\}$ is formed.

In a decision step 124 it is checked whether said intersection $Q^{(i,\ i+1)}$ is sufficiently large with respect to the pre-determined threshold value $Q^{(c)}$. If the intersection $Q^{(i,i+1)}$ is sufficiently large (Y), the considered generation is rejected, and the procedure jumps back to processing step 122. Otherwise (N), i.e. if the intersection $Q^{(i,i+1)}$ does not seem to be so large, in particular if it falls below the threshold value $Q^{(c)}$, the next scan $\{X^{(i+1)}\}$ is requested in an output step 131, followed by the final step 129. The request can be directed to the user. Particularly in the case of a laser scanner 10 being mounted on an autonomously moving robot, the request can also cause the robot to stop and cause an automatic triggering of the scanning process.

The described method will start again only after the generation of this next scan $\{X^{(i+1)}\}$, its registration for test purposes in the current cluster $G_m$ (process step 103) and the confirmation of registering (process step 105). Ideally, an auto-clustering is not necessary at all, since all scans $\{X^{(i)}\}$ are registered in the same cluster $G_m$. Should the scene disintegrate nevertheless into clusters $G_k$, $G_l$, these clusters are joined according to the first method after generation of all scans $\{X^{(i)}\}$.

According to yet another method embodiment, after the generation of each scan $\{X^{(i)}\}$, it is tried to register such scan (for test purposes), i.e., to add it to the previous cluster $G_l$. Registering may take place between two scans when the color camera 25 is used. Optionally, the laser scanner 10 allows for the next (regular) scan $\{X^{(i)}\}$ only when a registering of the scans made until now has been successful.

If the previous cluster $G_l$ shall be terminated and a new cluster $G_k$ shall (must) be started, i.e. if registering for test purpose has been unsuccessful, at least one additional (extraordinary) scan $\{X^{(j)}\}$ is requested from the user, usually in the area scanned last, from which the cluster which has just been terminated $G_l$ and the cluster which has been started $G_k$ (i.e. the unsuccessfully joined clusters) come, and which can be visualized to the user in a contemporary way. The later the request for the additional scan $\{X^{(j)}\}$ occurs, the more difficult is it for the user to find the correct area with the unsuccessfully joined clusters $G_l$, $G_k$.

The pairs are formed from the additional scan $\{X^{(j)}\}$ and from selected, available scans $\{X^{(i)}\}$ of the cluster which has just been terminated $G_l$. When the terminated cluster $G_l$ has been successfully complemented with the additional scan, it is tried to join the terminated cluster $G_l$ and the cluster which has just been started $G_k$. If appropriate, a further request for an additional scan takes place.

These last two described methods may be combined with each other, i.e., if, the intersection $Q^{(i,i+l)}$ contrary to all expectations was clearly too small, an additional scan can be requested.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for optically scanning and measuring a scene by a laser scanner configured to measure three-dimensional (3D) coordinates, the method comprising:
   generating a plurality of scans with the laser scanner, the laser scanner having a position tracking device, a distance meter and processor operable to determine three-dimensional coordinates based at least in part on the speed of light in air;
   determining, with the position tracking device, a position of the laser scanner at each of the plurality of scans;
   determining, with the processor, a first cluster that includes a plurality of registered first scans from the plurality of scans;
   determining, with the processor, a second cluster that includes a plurality of registered second scans from the plurality of scans;
   forming, with the processor, a pair of scans that includes a first scan from the plurality of registered first scans and a second scan from the plurality of registered second scans;
   forming, with the processor, an intersection of the pair of scans and comparing a characteristic of the intersection with a threshold value, the threshold value being based at least in part on each of the determined laser scanner positions, the threshold value being selected from a group consisting of a number of registration points contained in the intersection, a number of registration targets contained in the intersection, a surface area of the intersection, and a one-dimensional characteristic of the intersection; and
   registering, with the processor, the pair of scans when the characteristic of the intersection exceeds the threshold value.

2. The method of claim 1, further comprising accepting the registered pair of scans when the registration is successful.

3. The method of claim 1, wherein each of the plurality of scans each have a center location, wherein the center location are in a relative position to each other.

4. The method of claim 3, wherein a size of the registered pair of scans has a characteristic shape.

5. The method of claim 3, wherein the intersection is based at least in part on the center location and characteristic shape.

6. The method of claim 3, further comprising determining the center locations with the position tracking device.

7. The method of claim 6, wherein the position tracking device includes at least one of a hodometer, an inertial measurement unit (IMU), an altitude sensor, a compass, and a global positioning system (GPS), wherein the IMU includes at least one of a gyroscope and an inclinometer.

* * * * *